United States Patent
Crowley et al.

(10) Patent No.: US 9,921,571 B2
(45) Date of Patent: Mar. 20, 2018

(54) METHODS FOR MANUFACTURING PARTS IN CNC MACHINES

(71) Applicant: Apple Inc., Cupertino, CA (US)

(72) Inventors: Matthew Wagner Crowley, San Francisco, CA (US); Nathaniel H. Henderson, San Jose, CA (US); Christopher A. Hunt, Los Gatos, CA (US); Matthew S. Theobald, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/500,935

(22) Filed: Sep. 29, 2014

(65) Prior Publication Data

US 2016/0089761 A1 Mar. 31, 2016

(51) Int. Cl.
*B23Q 17/22* (2006.01)
*G05B 19/402* (2006.01)
(Continued)

(52) U.S. Cl.
CPC ........... *G05B 19/402* (2013.01); *B23Q 3/064* (2013.01); *B23Q 7/042* (2013.01); *B23Q 17/20* (2013.01);
(Continued)

(58) Field of Classification Search
CPC .......... G05B 19/41815; G05B 19/4182; G05B 19/41825
See application file for complete search history.

(56) References Cited

U.S. PATENT DOCUMENTS 4,061,064 A * 12/1977 Kindgren ............. B21D 28/243
408/13
4,328,726 A * 5/1982 Pearl ..................... B26D 5/005
33/1 M
(Continued)

FOREIGN PATENT DOCUMENTS

WO WO2004009440 A2 1/2004
WO WO 2013167903 A1 * 11/2013 ......... A61C 13/0022

OTHER PUBLICATIONS

Woody, Smith, Miller; Improving the Accuracy of Large Scale Monolithic Parts Using Fiducials; Jan. 2005; CIRP Annals—Manufacturing Technology; 4 pages.*

(Continued)

*Primary Examiner* — Jacob Cigna
(74) *Attorney, Agent, or Firm* — Downey Brand LLP

(57) ABSTRACT

This application relates to methods for applying automated precision machining operations to an oversized workpiece with a compact computer numerical control (CNC) machining apparatus. By shifting an oversized workpiece through a working area of the CNC machining apparatus, the CNC machining apparatus can apply machining operations to any portion of the workpiece in an automated manner. To achieve precision results, a position of the workpiece is tracked as the workpiece is shifted through the working area. In some embodiments, a probe can be utilized to track the shifting of the workpiece by determining a location of a machined feature after a particular shift has been completed. In this way, a position of the workpiece can be tracked without having to rely upon tolerances inherent to a workpiece manipulator.

17 Claims, 11 Drawing Sheets

(51) Int. Cl.
*B23Q 3/06* (2006.01)
*B23Q 7/04* (2006.01)
*B23Q 17/20* (2006.01)

(52) U.S. Cl.
CPC .................... *B23Q 17/2233* (2013.01); *G05B 2219/35491* (2013.01)

(56) References Cited

U.S. PATENT DOCUMENTS

| | | | | |
|---|---|---|---|---|
| 4,483,472 | A * | 11/1984 | Gerber | B65H 20/18 226/159 |
| 5,042,338 | A * | 8/1991 | Gerber | B26D 3/12 83/34 |
| 5,163,008 | A * | 11/1992 | Gerber | B26D 7/015 226/27 |
| 5,615,474 | A * | 4/1997 | Kellner | G05B 19/41815 29/243.53 |
| 5,949,685 | A * | 9/1999 | Greenwood | G05B 19/404 356/634 |
| 6,230,070 | B1 * | 5/2001 | Yodoshi | B23Q 1/267 700/162 |
| 6,406,229 | B1 | 6/2002 | Derrick et al. | |
| 6,480,757 | B1 | 11/2002 | Susnjara | |
| 6,782,596 | B2 * | 8/2004 | Miller | B23Q 17/20 29/407.05 |
| 7,076,856 | B2 * | 7/2006 | Sarh | B21J 15/10 29/524.1 |
| 8,313,271 | B2 * | 11/2012 | Smith | B23Q 17/2233 408/3 |
| 2007/0199187 | A1 | 8/2007 | Ohmori et al. | |
| 2007/0284216 | A1 * | 12/2007 | Meier | B23Q 7/1431 198/346.2 |
| 2009/0018689 | A1 * | 1/2009 | Smith | B23Q 17/2233 700/114 |
| 2012/0213604 | A1 * | 8/2012 | Gu | G05B 19/402 409/131 |
| 2012/0239181 | A1 * | 9/2012 | Gu | B23Q 17/22 700/176 |
| 2014/0113248 | A1 * | 4/2014 | Johansson | A61C 13/0004 433/173 |
| 2015/0093720 | A1 * | 4/2015 | Beeby | A61C 13/0022 433/202.1 |

OTHER PUBLICATIONS

"Probing. Touch Trigger and Analogue Scanning Probes" <www.CMMXYZ.com/probing.html> published Aug. 29, 2013, 5 pages.*
"How to make a multiple hole jig" <http://www.diynetwork.com/how-to/skills-and-know-how/carpentry-and-woodworking/how-to-make-a-multiple-hole-jig> Ret. Jun. 27, 2017.*
PCT Application No. PCT/US2014/059762—International Search Report and Written Opinion dated Jun. 19, 2015.

* cited by examiner

METHODS FOR MANUFACTURING PARTS IN CNC MACHINES

FIELD

The described embodiments relate generally to methods for machining oversized parts. More particularly, the present embodiments relate to methods for shifting an oversized part through a working area of an automated machining assembly.

BACKGROUND

As oversized consumer electronic devices advance and assume increasingly thinner profiles, one way to reinforce these thin profile large devices is to use high strength materials that can provide robust structural support to the device without adding considerable bulk or weight. Parts made from high strength materials can require difficult and time-consuming operations to form and finish. For example, high strength metals can be formed and shaped by applying a number of subtractive machining operations to a block or extrusion of high strength material. Unfortunately, automated machining assemblies large enough to accommodate the aforementioned large components tend to be extremely expensive. Furthermore, while applying a machining operation to a larger part with a smaller machining assembly is possible, the smaller machining assembly is not configured to continue an automated machining operation outside of a working area of that smaller machining assembly. For this reason, automated machining assemblies having working areas smaller than a size of the oversized component have not been well suited for use with the oversized component.

SUMMARY

This paper describes various embodiments that relate to methods for cost-efficient and high volume machining of oversized parts in computer numerical control (CNC) machinery.

A method for machining a workpiece is disclosed. The method includes at least the following steps: positioning a first portion of the workpiece in a working area of a fixturing device; machining a feature into the first portion of the workpiece; shifting a second portion of the workpiece into the working area of the fixturing device; and determining a precise location of the workpiece by measuring a position of the machined feature when the second portion of the workpiece is positioned within the working area of the fixturing device.

A fixturing device for securing an oversized workpiece during a plurality of computer numerical control (CNC) driven machining operations is disclosed. The fixturing device includes at least the following elements: a base having a substantially flat surface configured to support a first surface of the workpiece; a number of clamps coupled with the base, the clamps being aligned so that the clamps align a lateral surface of the workpiece with a datum of a CNC machining apparatus when the workpiece is secured by the clamps; and a number of support members extending from opposite sides of the base and configured to support portions of the workpiece extending from the opposite sides of the base, the support members including surfaces configured to support the workpiece that are substantially coplanar with the substantially flat surface of the base. The base and the support members are configured to support the workpiece in a number of different positions during each of the CNC driven machining operations, each of the different positions placing a different portion of the workpiece within a working area of the CNC machining apparatus. The working area of the CNC machining apparatus is substantially smaller than at least one dimension of the workpiece.

A non-transient computer readable medium for machining a workpiece secured by a fixturing device with a computer numerical control (CNC) machining apparatus is disclosed. The non-transient computer readable medium includes at least the following: computer code for securing the workpiece in a known position with the fixturing device so that a first portion of the workpiece is disposed within a working area of the CNC machining apparatus; computer code for machining a first feature into the first portion of the workpiece; computer code for shifting the workpiece to another position in which a second portion of the workpiece is disposed within the working area, wherein the second portion includes the first feature; computer code for securing the workpiece in the other position with the fixturing device; computer code for measuring a position of the first feature; and computer code for determining a position and orientation of the workpiece using a datum defined by the fixturing device and the measured position of the first feature.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
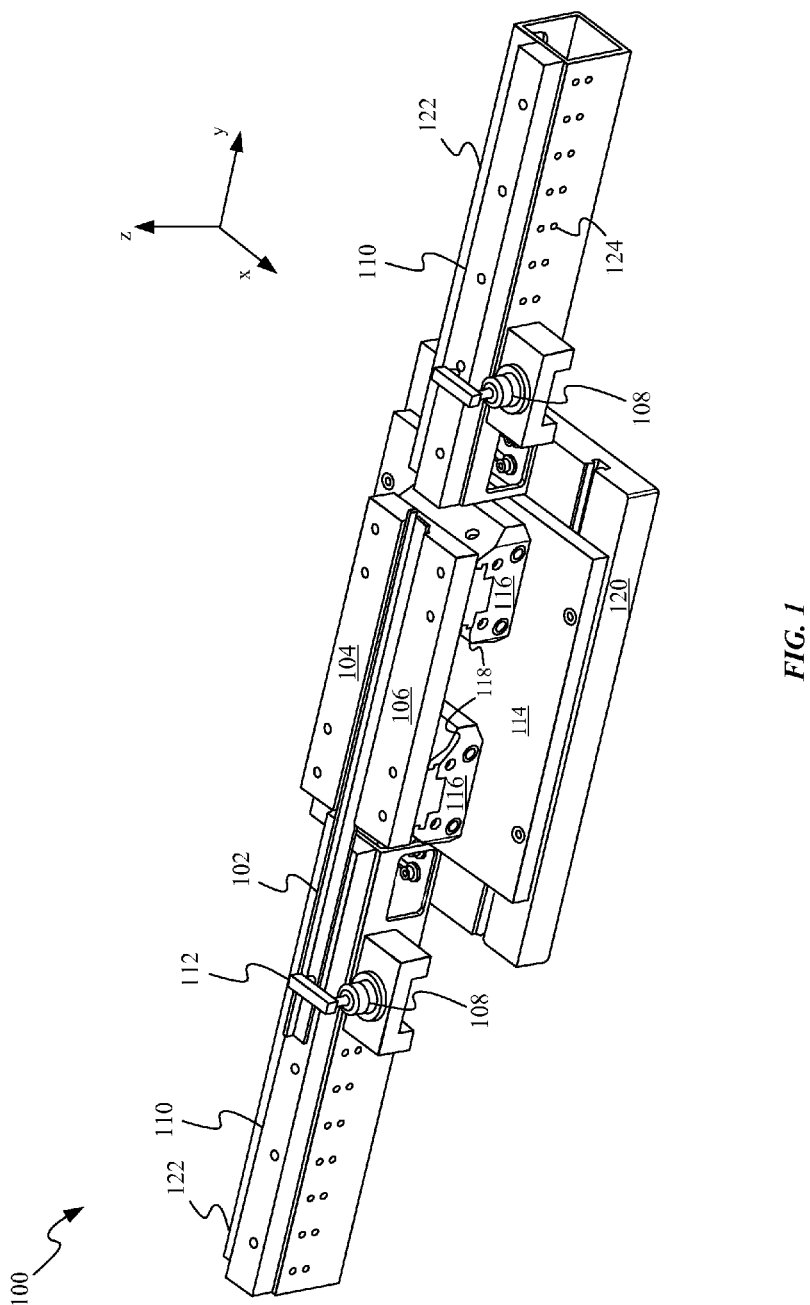
FIG. 1 shows exemplary computer numerical control (CNC) machinery configured to conduct a machining operation upon a workpiece secured in a first position.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

High precision machining operations are typically reserved for producing limited production items along the lines of mold units and prototype parts. While computer numerical control (CNC) driven machining tools have become increasingly common and have made the mass production of machined parts more cost effective, the number of different machining operations and different types of tools used to machine the parts can make machined parts substantially more expensive than for example, parts produced by casting or molding operations. Furthermore, while CNC driven machining tools are becoming more prolific, large scale CNC driven machining tools are still in the realm of specialty tools and are substantially more expensive to procure. Although contracting out the machining of large parts allows a producer to avoid the capital costs associated with purchasing large scale CNC equipment, the cost of contracting out the work can also be prohibitively expensive, especially when a large number of parts are desired. Moreover, specialty machine shops in possession of such machinery and familiar with making such parts are not generally equipped to handle mass production of such parts. Consequently, mass producing large parts formed at least in part by CNC operations can be prohibitively expensive and in some cases unfeasible without large capital outlays.

One solution is to adapt compact CNC driven machinery for large parts. CNC driven machinery is generally designed to bring machining tools in contact with a workpiece disposed within a working area of the CNC driven machinery. By adding a workpiece manipulator that repositions various portions of a workpiece within the working area at various stages of a machining operation, machining operations can be sequentially performed to portions of the workpiece when a corresponding portion of the workpiece is positioned within the working area. Unfortunately, tolerances of many workpiece manipulators can be great enough to introduce an unacceptable amount of variance into machining operations performed subsequent to a repositioning of the workpiece. To maintain machining tolerances after each repositioning of the workpiece, a probe can be configured to determine a location of a previously-machined feature after the repositioning is completed by the workpiece manipulator. When the workpiece is constrained in at least one direction by a fixturing device the determined position of one of the previously-machined feature can be sufficient to allow the CNC driven machinery to determine a precise position and orientation of the workpiece after the repositioning.

Because the calibration of the CNC machinery depends primarily upon a position of another feature machined by the CNC machinery, positional uncertainty is limited to tolerances in the probe and the machining equipment itself. By utilizing a high precision probe and machining tools, a high level of precision can be maintained throughout any number of shifting operations. In this way, machining operations performed upon the piece can be performed with a great amount of precision regardless of a number of times the workpiece is repositioned. It should be noted that because this method allows each workpiece to be machined with a single set of CNC machinery, machining tolerances can all be substantially the same for any given part. Furthermore, there is less chance of variation in processes due to variable time intervals between machining operations. In this way a consistency of the machined features of each part can be substantially increased.

These and other embodiments are discussed below with reference to FIGS. 1-11; however, those skilled in the art will readily appreciate that the detailed description given herein with respect to these figures is for explanatory purposes only and should not be construed as limiting.

FIG. 1 shows exemplary CNC machinery 100 configured to conduct a machining operation upon a workpiece. The workpiece can take the form of extrusion 102. While the example of an extrusion will be utilized for the balance of this paper it should be understood that the techniques described herein can be applied to any oversized part and particularly to oversized parts having a substantially consistent cross-sectional area. The constant cross-sectional area allows clamps or chucks to maintain a given spacing throughout a number of position changes of the extrusion. In some embodiments, extrusion 102 can be formed of a lightweight material along the lines of extruded aluminum. CNC machinery 100 includes a number of features configured to keep extrusion 102 in place while machining operations are performed. Softjaw chucks 104 and 106 clamp around a portion of extrusion 102 to prevent movement of extrusion 102 along the X-axis. Depending on how much force softjaw chucks 104 and 106 exert upon extrusion 102, friction between softjaw chucks 104 and 106 and extrusion 102 can also constrain movement of extrusion 102 in the y-axis and the z-axis. Z-clamps 108 are configured to exert a force on a top-facing surface of extrusion 102 so that extrusion 102 is trapped between runners 110 and pneumatic clamp 112. In this way runners 110 can maintain a position in the z-axis of extrusion 102 throughout a machining operation including a number of moves. Z-clamps 108 can be fixed in place by being fastened to extensions 122 and can maintain extrusion 102 in place between position shifts in extrusion 102.

Softjaw chucks 104 and 106 are supported above fixture base 114 by supports 116. Supports 116 include adjustment features 118 that allow for adjustment of softjaw chucks 104 and 106 in the x-axis. In some embodiments adjustment features 118 can also be utilized to separate or reduce a pressure applied by softjaw chucks 104 and 106. Fixture base 114 can be shifted with respect to bottom plate 120 along the y-axis. In this way, softjaw chucks 104 and 106 can be maneuvered in the x-axis and the y-axis. In some embodiments, maneuverability of softjaw chucks 104 and 106 by way of adjustment features 118 can allow refinement of a position of softjaw chucks 104, which can be especially helpful when utilizing the softjaw chucks as a datum for setting a position of extrusion 102. In addition to providing a track upon which fixture base 114 can be maneuvered, bottom plate 120 can also provide mounting features for extensions 122 to be securely affixed. Extensions 122 in turn provide a structure upon which both runners 110 and Z-clamps 108 can be mounted. A position at which Z-clamps 108 are coupled with extensions 122 can be changed by attaching z-clamps 108 to different mounting holes 124.

Figure 2:
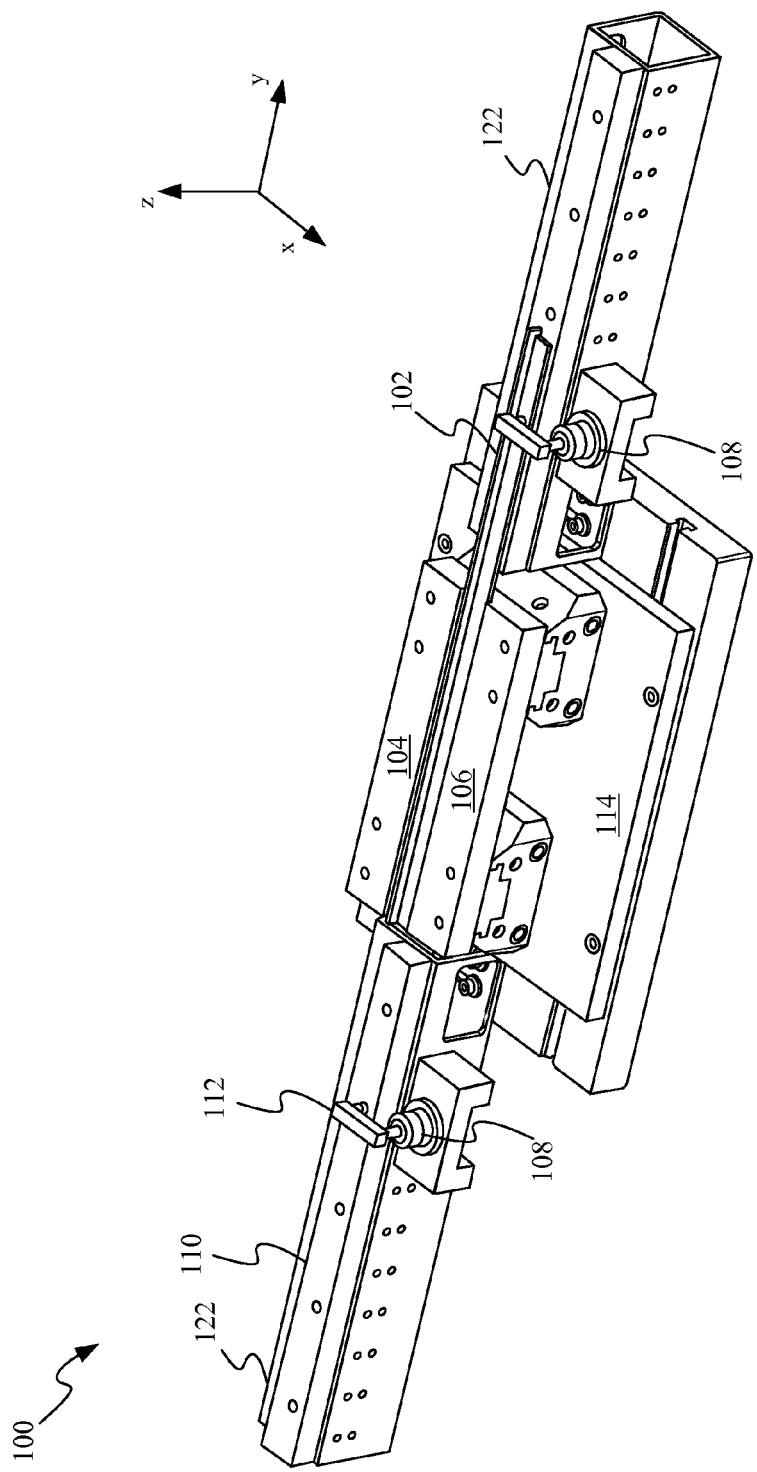
FIG. 2 shows the CNC machinery depicted in FIG. 1 securing a workpiece in a second position different than the first position.

FIG. 2 shows CNC machinery 100 securing extrusion 102 in another position different from the position depicted in FIG. 1. To shift extrusion 102 to the other position in this manner, Z-clamp 112 is released and softjaw chucks 104 and 106 release extrusion 102 to allow extrusion 102 to be maneuvered. A manipulator apparatus (not depicted) can be utilized to attach to and move extrusion 102 between the position depicted in FIG. 1 and the other position depicted in FIG. 2. Details regarding how extrusion 102 can be moved while maintaining precise track of a position of extrusion 102 will be described in further detail below. Although only two positions are depicted it should be understood that any number of intermediate positions could be utilized to maneuver an oversized workpiece through a working area of CNC machinery 100. In some embodiments, the working area can be limited to an area adjacent to and above softjaw chucks 104 and 106.

Figure 3:
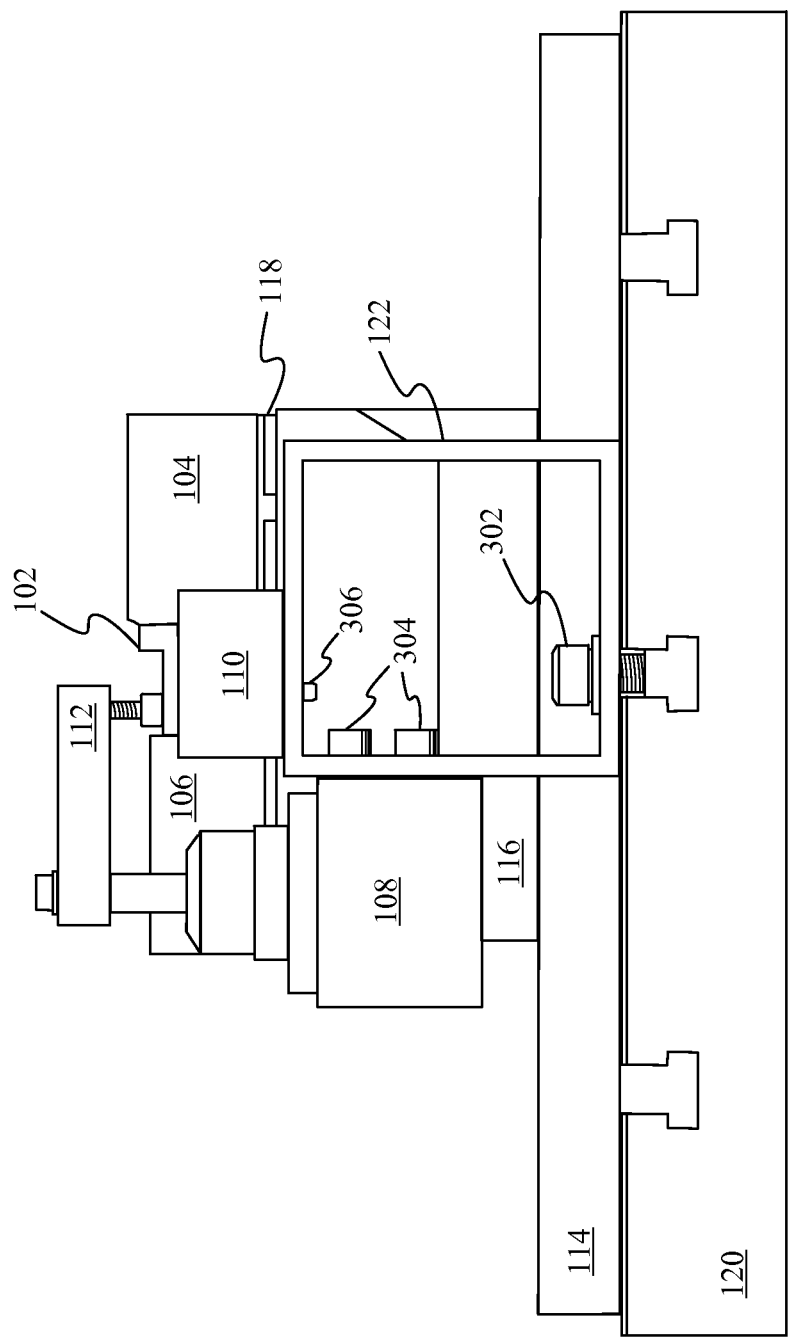
FIG. 3 shows a side view of the CNC machinery depicted in FIG. 1.

FIG. 3 shows a side view of CNC machinery 100. In this embodiment, numerous fasteners are depicted including fastener 302 which is shown securing extension 122 to bottom plate 120. Fasteners 304 are depicted fastening Z-clamp 108 to extension 122. Adjustment feature 118 associated with softjaw chuck 104 is also depicted. Z-clamp 112 is depicted securing extrusion 102 against runner 110. Runner 110 is secured to extension 122 by fastener 306, a bottom portion of which is depicted extending into an interior portion of extension 122.

Figure 4A:
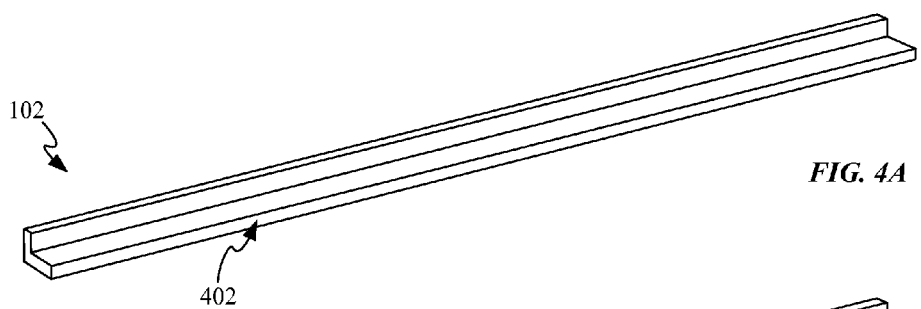
FIG. 4A shows an extrusion prior to undergoing a machining operation.
Figure 4B:
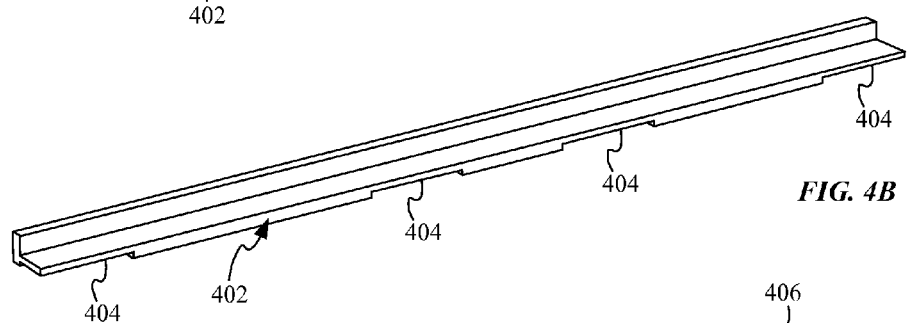
FIG. 4B shows a number of flat pockets formed in a base portion of the extrusion.
Figure 4C:
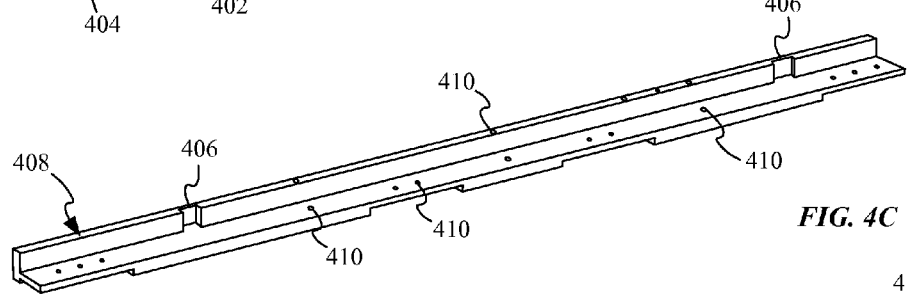
FIG. 4C show positions in which a number of openings can be machined through the extrusion.

FIG. 4A shows extrusion 102 prior to undergoing any machining operations. Extrusion 102 can take many forms. In the depicted embodiment, extrusion 102 has an L-shaped geometry. Extrusion 102 can be formed of any of a number of materials compatible with extrusion processes. In some embodiments, extrusion 102 can be formed of aluminum. FIG. 4B shows how selected regions of base portion 402 of extrusion 102 can be machined away to form flat pockets 404. Flat pockets 404 can be configured to provide space to attach a bracket to extrusion 102 without increasing a thickness or overall size of extrusion 102. In some embodiments, at least one of pockets 404 can be configured to accommodate various components having portions that overlap or underlap base portion 402 of extrusion 102. FIG. 4C shows how a top portion of extrusion 102 can be machined. In some embodiments, slots 406 can be formed through subtractive machining of wall portion 408 of extrusion 102. Slots 406 can be positioned to accommodate various devices or protruding portions of devices. For example, in some embodiments one of slots 406 can be configured to provide space for a sensor along the lines of a microphone or an imaging device. In some embodiments, slot 406 can also include an opening that extends completely through extrusion 102. In this way the sensor can record input it can detect through the opening. Also depicted in FIG. 4C are numerous openings 410. Openings 410 positioned over flap pockets 404 can be configured to help affix a bracket to extrusion 102 at flat pocket 404. Other openings 410 can serve dual purposes; for example, one of openings 410 can be used both as an attachment point for another component and as a reference point for determining a precise position of extrusion 102 after shifting extrusion 102 between machining operations.

Figure 4D:
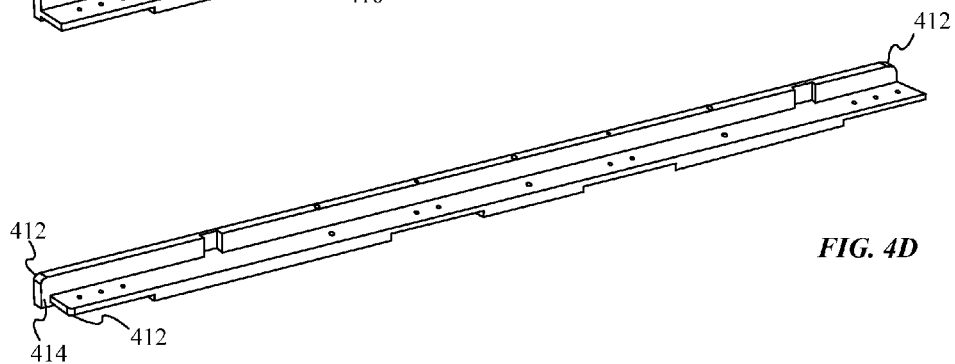
FIG. 4D shows how various portions of the extrusion can be removed to change an exterior geometry of the extrusion.

FIG. 4D shows how various portions of extrusion 102 can be machined away to conform with various other components with which extrusion 102 would interact. For example, FIG. 4D depicts how two shoulders 412 can be removed from extrusion 102. Removal of these portions can help extrusion 102 to fit within an enclosure or conform around other internal features. Extrusion 102 also includes protrusion 414 which can be formed by machining away a base portion of extrusion 102 while leaving a wall portion of extrusion 102 protruding away from the base portion and thereby forming protrusion 414. It should be noted that the depicted machining features can be formed sequentially and in a different order than the depicted order. For example, all of the depicted machining operations can be applied to one end of extrusion 102 prior to applying any machining operations to a central portion of extrusion 102 or an opposite end of extrusion 102.

Figure 5:
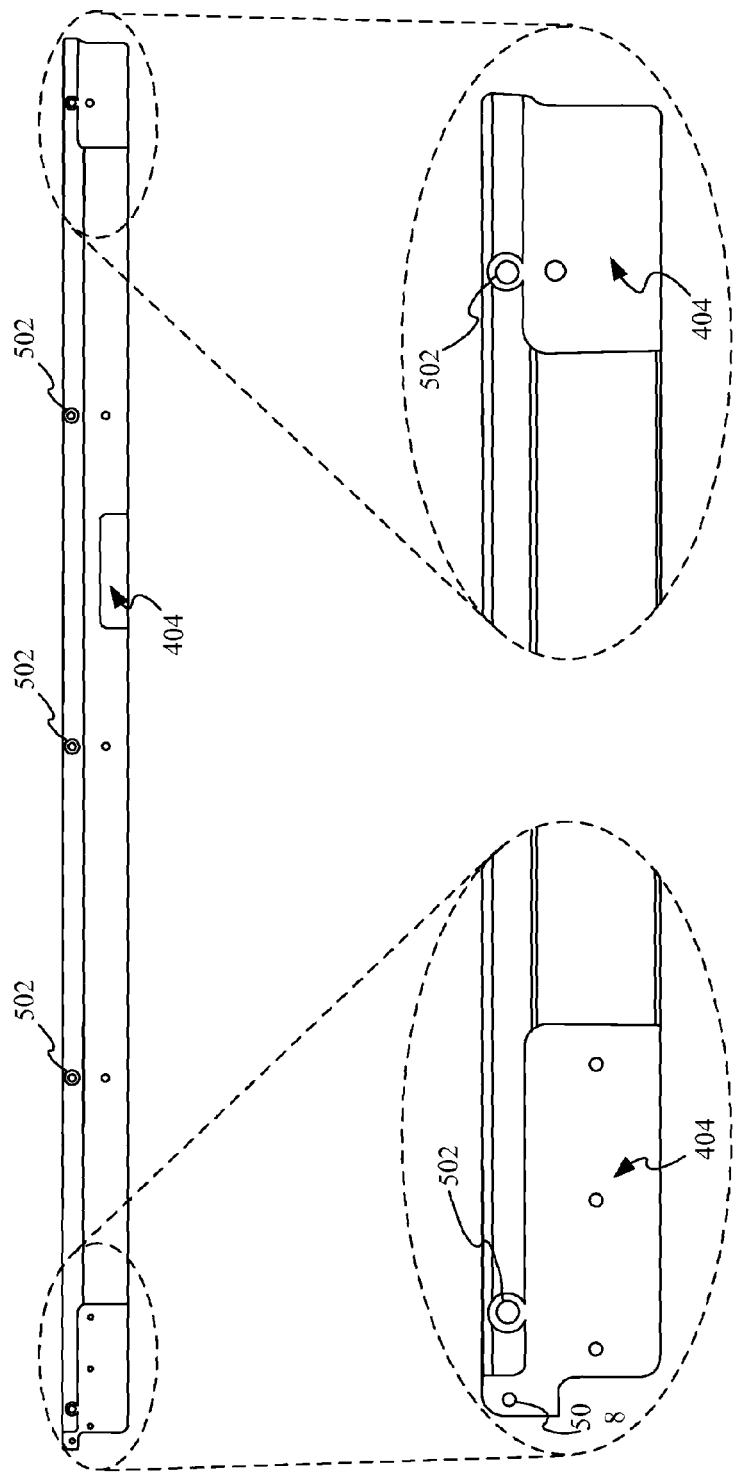
FIG. 5 shows a bottom view of a machined extrusion with close-up views of opposing ends of the machined extrusion.

FIG. 5 shows a bottom view of a machined extrusion 102 with close-up views of each end of machined extrusion 102. This depiction shows details about potential differences between configurations of flat pockets 404. For example, the left flat pocket 404 includes three different openings while the right flat pocket 404 is narrower and includes only one opening. Machined extrusion 102 can also include openings 502, which can be drilled within extrusion 102 at regular intervals. In some embodiments openings 502 can be drilled primarily so that a probe can be used to locate a position of extrusion 102 within CNC machinery 100 by locating openings 502.

Figure 6A:
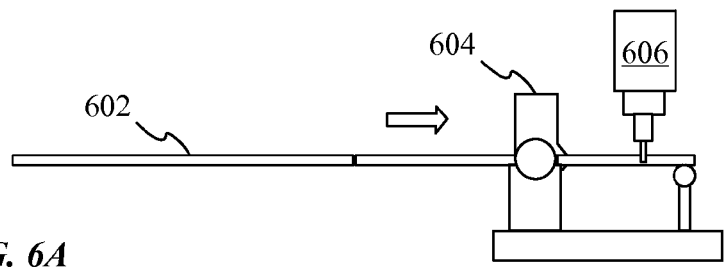
FIGS. 6A-6D show a number of side views of a machining process in which portions of a workpiece are maneuvered through a piece of CNC machinery.
Figure 6B:
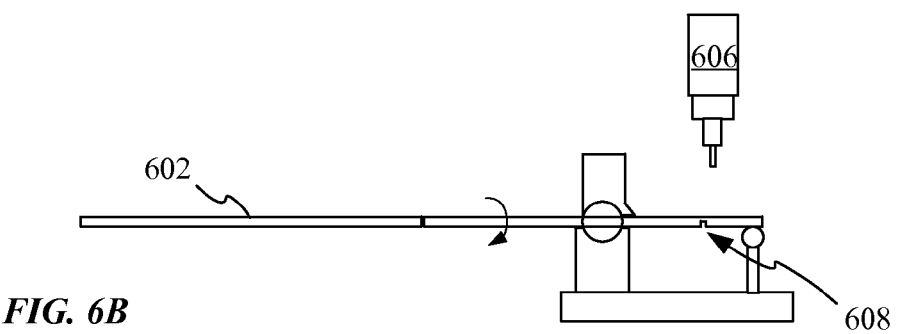
Figure 6C:
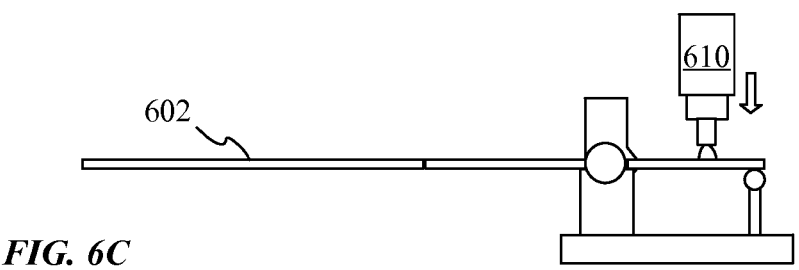
Figure 6D:
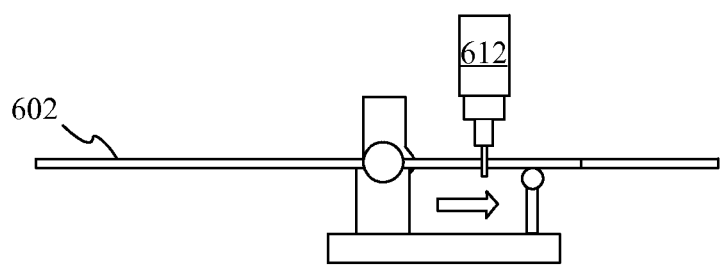

FIGS. 6A-6D depict a number of side views of a machining process in which a workpiece is maneuvered through a piece of CNC machinery. FIG. 6A shows a workpiece 602 positioned within fixturing device having an indexing head 604 configured to both secure workpiece 602 in place and to rotate workpiece 602 at least 180 degrees. Machining tool 606 machines feature 608 into workpiece 602. FIG. 6B shows how after machining the feature indexing head 604 rotates workpiece 602 180 degrees so that a bottom side of workpiece 602 can be machined. Subsequent to machining features 608 in the bottom side of workpiece 602 a pneumatic gripper or manipulator 610 can be used to maneuver workpiece 602 so that another portion of workpiece 602 can be machined. FIG. 6D shows how after workpiece 602 is maneuvered probe 612 can be used to determine a precise position of workpiece 602 by locating one of machined features 608. Probe 612 can include a spring based probing feature that has a complementary geometry to machined features 608, so that probe 612 can determine with high confidence a position of any one of machined features 608.

Figure 7A:
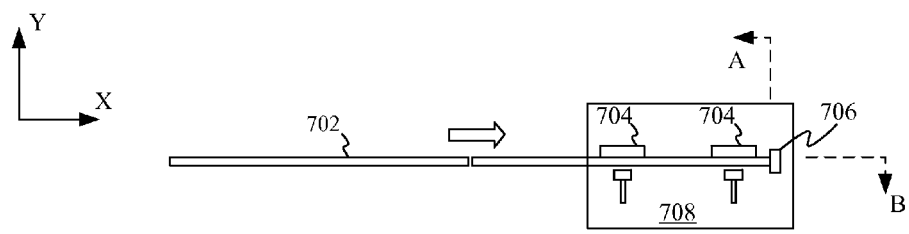
FIGS. 7A-7D show a number of top views depicting a machining process in which a workpiece is maneuvered through a number of different pieces of CNC machinery.

FIGS. 7A-7D show a process in which a workpiece is rotated through a number of different machining fixtures to create a desired set of machined features in the workpiece. FIG. 7A shows a top view of fixturing device 700 and how in a first step of the process workpiece 702 can be placed between clamps 704 arranged to either side of workpiece 702 and then fed through clamps 704 until a substantially flat end of workpiece 702 comes into abutting contact with indexing feature 706. A surface of indexing feature 706 that contacts workpiece 702 can also be substantially flat so that indexing feature 706 acts as an A datum that establishes a position of workpiece 702 in the X-axis. Once clamps 704 engage workpiece 702 an inside surface of clamps 704 can act as a B datum that sets a position of workpiece 702 in the Y-axis. When a table or base 708 to which clamps 704 are affixed is also substantially flat, base 708 can set a position of workpiece 702 in the Z-axis. In this way an initial position of workpiece 702 can be well known prior to initiating a first machining operation.

Figure 7B:
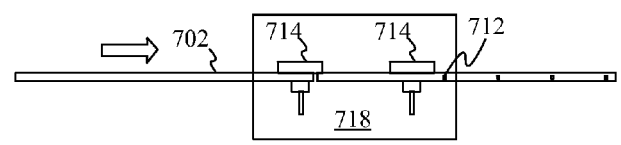
Figure 7C:
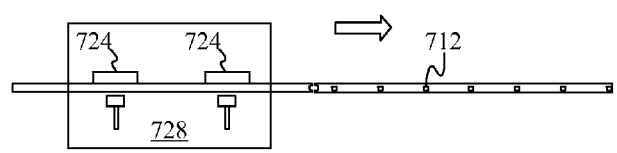
Figure 7D:
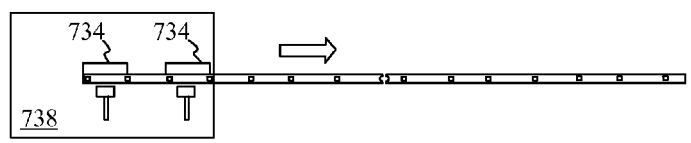

FIG. 7B shows workpiece 702 after undergoing the first machining operation and after workpiece 702 has been transferred to another machining fixture. Instead of using another indexing feature to determine a position of workpiece 702 in the X-axis a probe can be utilized to measure a position of one of machined features 712 formed during the first machining operation. In some embodiments, machined features 712 can take the form of milled rivet holes. Because a Y-axis and Z-axis of workpiece 702 can be established by clamps 714 and base 718, by measuring a position of one of machined features 712. The position of one of machined features 712 can be determined with a probe mounted to an articulated arm, along the lines of a spring probe that engages one of machined features 712. When machining tools utilized to create machined features 712 are high precision tools determining the position of machined features 712 can provide a position of workpiece 702 in the X-axis with a high degree of precision. It should be noted that in some cases the probe can measure machined features 712 that are closest to base 718. In this way, features machined during a second machining operation can be offset in relation to the machined feature 712 that is closest to the newly machined features 712. FIGS. 7C and 7D show how clamps 724 and 734 and base s 728 and 738 can be utilized to apply additional machined features along a length of workpiece 702. Prior to executing subsequent machining operations workpiece 702 gets clamped between the clamps and a position of a newly machined feature 712 gets measured. In this way a position of machined features 712 can be kept within tight tolerances even though the workpiece is being switches between fixturing devices.

Figure 8A:
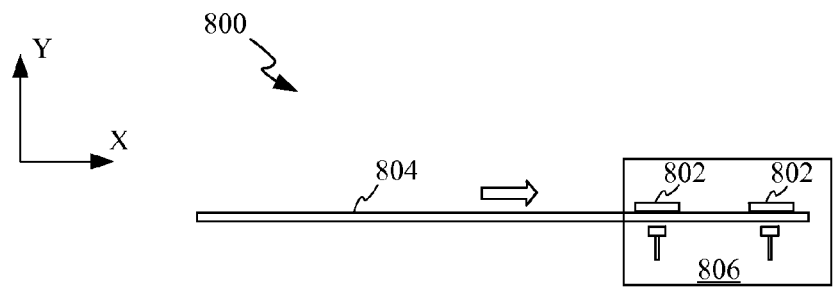
FIGS. 8A-8C show a top view and a number of side view depicting a machining process in which a workpiece is shifted through a working area of a fixture with a pneumatic workpiece manipulator.
Figure 8B:
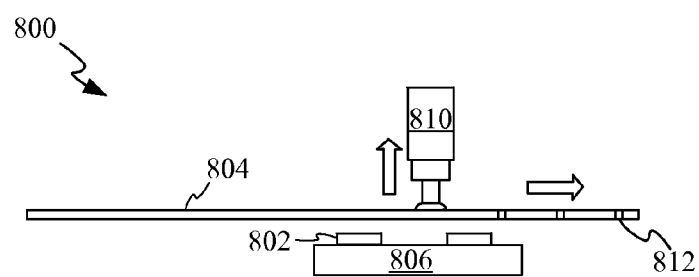
Figure 8C:
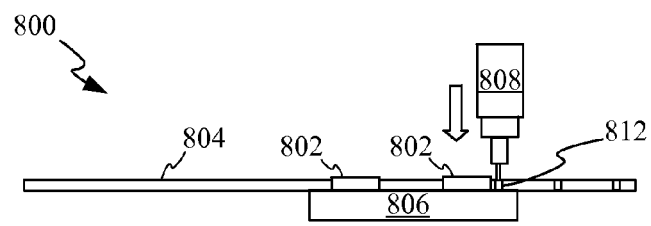

FIGS. 8A-8C show a number of steps relating to a process for shifting a workpiece on a fixture with a pneumatic workpiece manipulator. FIG. 8A shows a top view of a fixturing device 800 having clamps 802 designed to secure workpiece 804 in place during various machining operations. Fixturing device 800 also includes base 806, probe 808 and pneumatic workpiece manipulator 810. Similarly to the embodiments described in FIGS. 7A-7D clamps 802 and base 806 can be utilized to determine a position of workpiece 804 in the Y and Z axes. While an indexing feature is not depicted an initial position of workpiece 804 can be determined with an indexing feature or alternatively probe 808 can measure a position of one end or corner of workpiece 804. In this way, the position of workpiece 804 can be determined prior to initiating a first machining operation. FIG. 8B shows a side view of fixturing device 800 and how workpiece manipulator 810 can be utilized to shift a position of workpiece 804 after a first machining operation has been applied to it that forms machined features 812. In some embodiments, manipulator 810 can shift workpiece 804 at least 100 mm. FIG. 8C shows another side view of fixturing device 800 in which probe 808 is used to measure a position of one of machined features 812 to determine a position of workpiece 804 in the X-axis prior to applying a second machining operation to workpiece 804.

It should be noted that because each machining operation is automated and performed with a single set of machining tools an amount of heat applied to the workpiece can be accounted for. As such, machining operations can be adjusted so that expansion of the workpiece during the automated machining operation can be compensated for, as a profile for any given workpiece can be developed so that thermal expansion has little or no impact upon the machining operation. Because an amount of time and heat generated by each stage or action in an automated machining operations can be predicted, a processor that controls the machining operations can send instructions to adjust positions at which machined features are applied to adjust for an amount of thermal expansion or contraction experienced at any given portion of a workpiece. In some embodiments, a thermal probe or sensor can be arranged to measure an amount of heat added to the workpiece so that the processor can determine whether workpiece 804 is experiencing a normal amount of heating. In some embodiments, probe 808 can include the heat sensor so that a position of a machined feature can be determined while a temperature of the workpiece proximate the machined feature can also be determined.

Figure 9A:
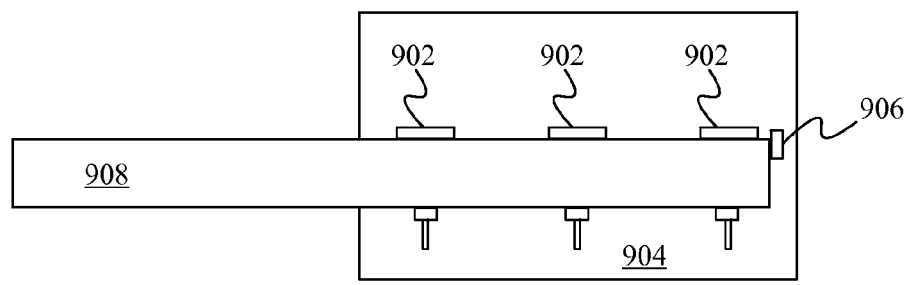
FIGS. 9A-9C show a number of top views of a machining process in which a workpiece is shifted through a working area of a fixturing device.
Figure 9B:
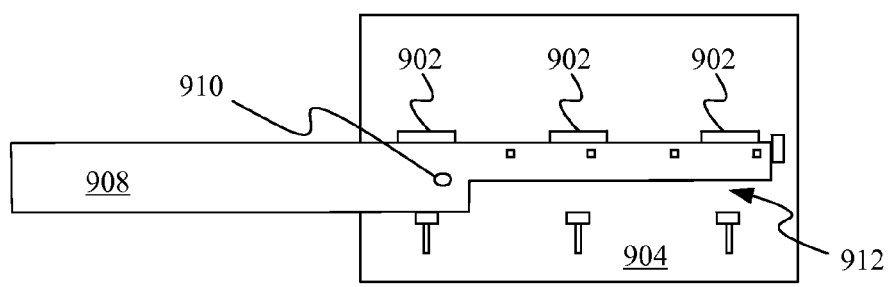
Figure 9C:
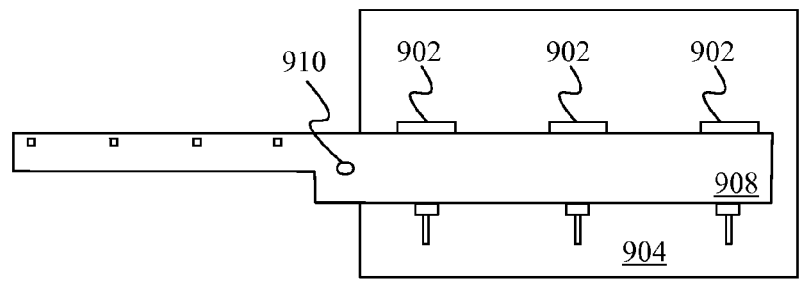

FIGS. 9A-9C show a number of steps in which an oversized workpiece is shifted through a fixturing device 900. Fixturing device 900 includes clamps 902, base 904 and indexing feature 906 that support, secure and align workpiece 908 in place upon fixturing device 900. FIG. 9A shows how workpiece 908 can be positioned within fixturing device 900 by feeding it into fixturing device 900 until workpiece 908 contacts indexing feature 906. In this way a position of workpiece 908 in the x-axis can be established after which clamps 902 can secure workpiece 908 in position along the y-axis. FIG. 9B shows a configuration of workpiece 908 within fixturing device 900 subsequent to a number of machining operations in which machined features 910 are added to workpiece 908. FIG. 9B also shows how a portion of workpiece 908 can be completely removed to form a notched region 912. Because both sides of workpiece 908 are still clamped by one of clamps 902 a position of workpiece 908 can remain known throughout the machining operation. FIG. 9C shows workpiece 908 flipped over so that another end of workpiece 908 can receive machining operations. A pneumatic manipulator can transition workpiece 908 from the position shown in FIG. 9B to the position shown in FIG. 9C by flipping workpiece 908 over after clamps 902 release workpiece 908. As depicted in FIG. 9C, workpiece 908 is again secured in fixturing device 900; however, in some embodiments, workpiece 908 can be placed in another fixturing device to complete machining operations on the other side of workpiece 908. As discussed in previous embodiments, once workpiece 908 is again secured in the fixturing device, machined feature 910 can be utilized to determine a location of workpiece 908 in the x-axis.

Figure 10:
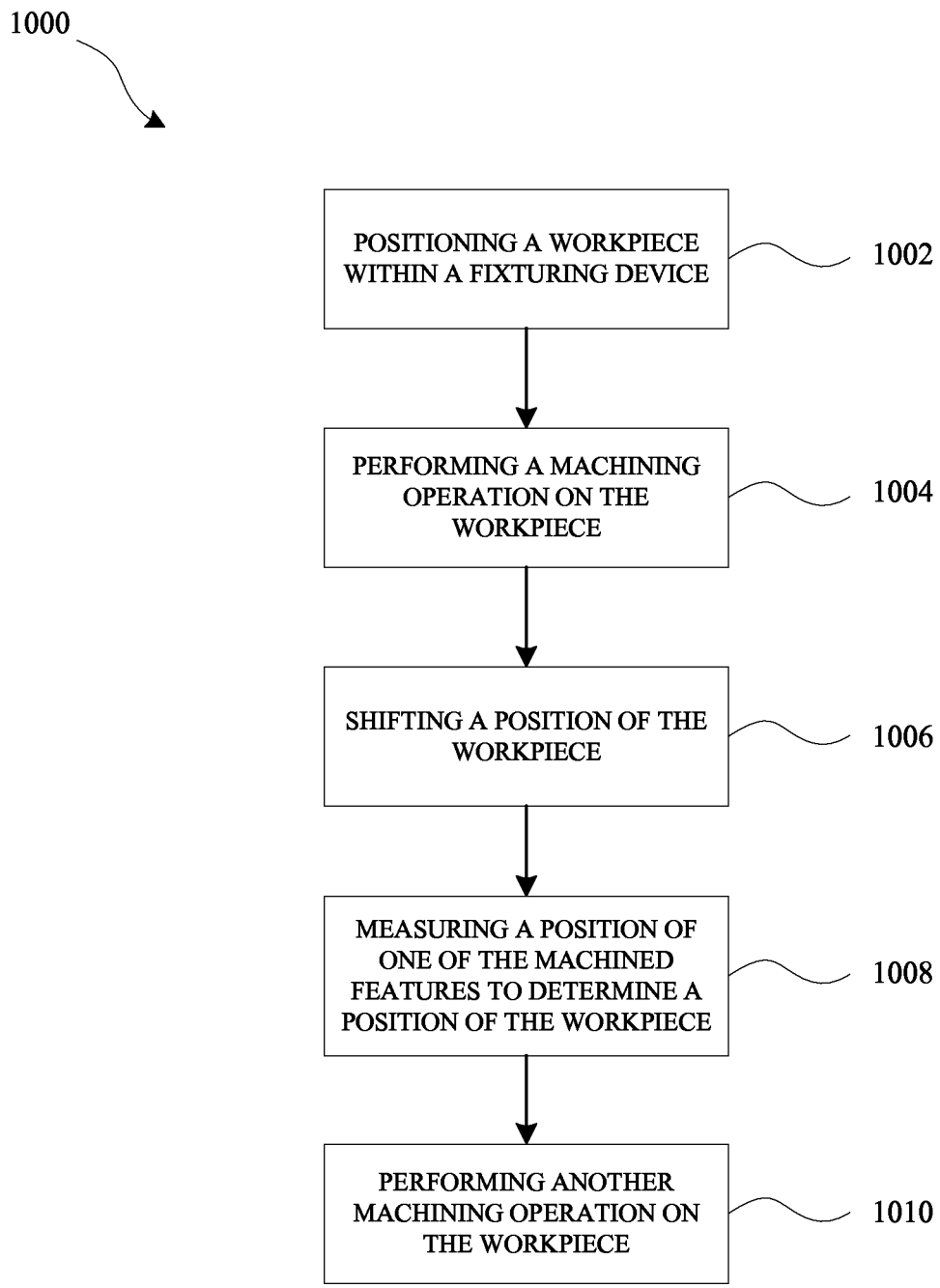
FIG. 10 shows a flow chart depicting a process for machining an oversized part in a CNC fixturing device.

FIG. 10 shows a flow chart 1000 depicting a method for machining an oversized part in a CNC fixturing device. At step 1002, a first portion of a workpiece is positioned within a working area of a fixturing device. A number of clamps are utilized to position the workpiece in a first direction and an indexing apparatus is utilized to position the workpiece in a second direction substantially perpendicular to the first direction. The fixturing device can include a substantially planar base which sets a position of the workpiece in a third direction substantially perpendicular to both the first and second directions. At step 1004, a number of machining operations are performed upon the workpiece. At step 1006, a manipulator is used to place a second portion of the workpiece within the working area of the fixturing device. At step 1008 a location of the workpiece in the first direction is determined by measuring a position of one of the previously machined features. At step 1010, a machining operation is applied to the workpiece. A position at which the machining operation is applied is adjusted based upon the position information obtained by the measurement taken by the probe.

Figure 11:
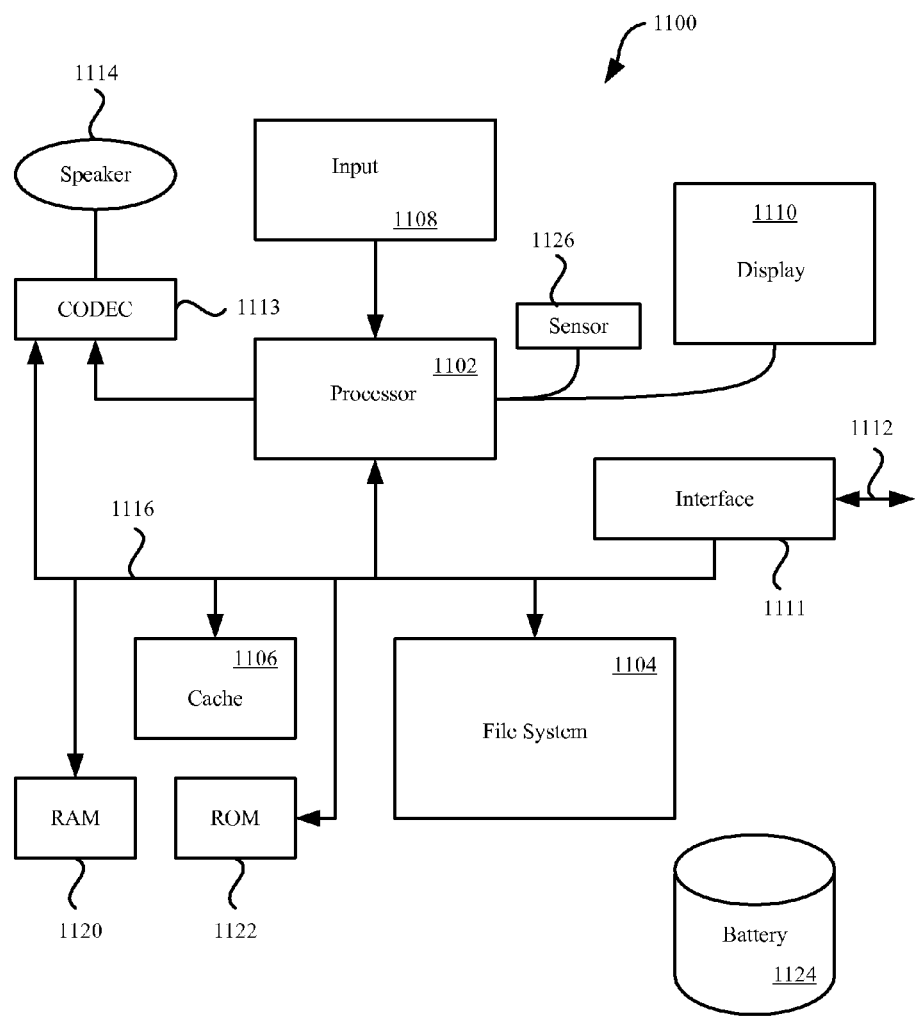
FIG. 11 shows a block diagram depicting components of an electronic device suitable for controlling operations of a CNC machining operation.

FIG. 11 is a block diagram of electronic device 1100 describing components suitable for controlling operations of a CNC machining operation in accordance with the described embodiments. Electronic device 1100 illustrates circuitry of a representative computing device. Electronic device 1100 includes a processor 1102 that pertains to a microprocessor or controller for controlling the overall operation of electronic device 1100. Electronic device 1100 contains instruction data pertaining to operating instructions in a file system 1104 and a cache 1106. The file system 1104 is, typically, a storage disk or a plurality of disks. The file system 1104 typically provides high capacity storage capability for the electronic device 1100. However, since the access time to the file system 1104 is relatively slow, the electronic device 1100 can also include a cache 1106. The cache 1106 is, for example, Random-Access Memory (RAM) provided by semiconductor memory. The relative access time to the cache 1106 is substantially shorter than for the file system 1104. However, the cache 1106 does not have the large storage capacity of the file system 1104. Further, the file system 1104, when active, consumes more power than does the cache 1106. The power consumption is often a concern when the electronic device 900 is a portable device that is powered by a battery 1124. The electronic device 1100 can also include a RAM 1120 and a Read-Only Memory (ROM) 1122. The ROM 1122 can store programs, utilities or processes to be executed in a non-volatile manner. The RAM 1120 provides volatile data storage, such as for cache 1106.

The electronic device 1100 also includes a user input device 1108 that allows a user of the electronic device 1100 to interact with the electronic device 1100. For example, the user input device 1108 can take a variety of forms, such as a button, keypad, dial, touch screen, audio input interface, visual/image capture input interface, input in the form of sensor data, etc. Still further, the electronic device 1100 includes a display 1110 (screen display) that can be controlled by the processor 1102 to display information to the user. A data bus 1116 can facilitate data transfer between at least the file system 1104, the cache 1106, the processor 1102, and a CODEC 1113. The CODEC 1113 can be used to decode and play a plurality of media items from file system 1104 that can correspond to certain activities taking place during a particular manufacturing process. The processor 1102, upon a certain operating event or events occurring, supplies the media data (e.g., audio file) for the particular media item to a coder/decoder (CODEC) 1113. The CODEC 1113 then produces analog output signals for a speaker 1114. The speaker 1114 can be a speaker internal to the electronic device 1100 or external to the electronic device 1100. For example, headphones or earphones that connect to the electronic device 1100 would be considered an external speaker.

The electronic device 1100 also includes a network/bus interface 1111 that couples to a data link 1112. The data link 1112 allows the electronic device 1100 to couple to a host computer or to accessory devices. The data link 1112 can be provided over a wired connection or a wireless connection. In the case of a wireless connection, the network/bus interface 1111 can include a wireless transceiver. The media items (media assets) can pertain to one or more different types of media content. In one embodiment, the media items are audio tracks (e.g., songs, audio books, and podcasts). In another embodiment, the media items are images (e.g., photos). However, in other embodiments, the media items can be any combination of audio, graphical or visual content. Sensor 1126 can take the form of circuitry for detecting any number of stimuli. For example, sensor 1126 can include any number of sensors or measurement tools for monitoring various operating conditions during a machining operation. For example, sensor 1126 can include a number of different sensors 1126 such as for example a temperature sensor, an audio sensor, a light sensor such as a photometer, a depth measurement device such as a laser interferometer and so on. In some embodiments sensor 1126 can take the form of a spring-based measurement apparatus along the lines of a probe to determine a position of a workpiece during a machining operation.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for machining a workpiece to form an enclosure for a portable electronic device, the enclosure having a first feature and a second feature, the method comprising:

machining a first feature into a first portion of the workpiece while the first portion is (i) positioned within a working area of a machining device, and (ii) secured to the working area with a fixturing device of the machining device;

measuring a first location of the first feature by engaging the first feature with an identification probe that is maneuverable relative to the fixturing device, wherein the identification probe has a geometry that is complementary to the first feature;

determining a second location for a second feature to be machined into a second portion of the workpiece by moving the identification probe relative to the fixturing device, wherein determining the second location for the second feature is based on the first location of the first feature;

rotating the workpiece in a direction defined by the fixturing device of the machining device such that the second portion of the workpiece is positioned within the working area; and machining the second feature at the second location and into the second portion of the workpiece, wherein the geometry of the identification probe is complementary to the second feature.

2. The method as recited in claim 1, wherein the first feature is machined into a first surface of the first portion of the workpiece and the second feature is machined into a second surface of the second portion of the workpiece, and the first and second surfaces are non-coplanar to each other.

3. The method as recited in claim 1, wherein the identification probe is capable of determining the first and second locations of the first and second features while the workpiece is secured to the working area.

4. The method as recited in claim 1, wherein an initial position of the first portion within the working area includes an X-axis coordinate that is determined by the identification probe.

5. The method as recited in claim 1, wherein the machining of the second feature is adjusted to account for thermal expansion of the workpiece.

6. The method as recited in claim 1, wherein, prior to machining the second feature at the second location, the workpiece is secured to the working area with a different fixturing device.

7. The method as recited in claim 1, wherein rotating the workpiece in the direction defined by the fixturing device further includes advancing the workpiece in a lengthwise direction defined by the fixturing device.

8. The method as recited in claim 1, wherein the first and second portions of the workpiece are fixed within the working area by one or more securing mechanisms of the fixturing device, and coordinates of the first and second portions of the workpiece are established by an indexing feature of the fixturing device.

9. The method as recited in claim 8, wherein the coordinates of the first and second portions of the workpiece include X-axis, Y-axis, and Z-axis coordinates.

10. A method for controlling first and second computer numeric control (CNC) machines to perform a continuous machining operation on a workpiece to form a finished part having a first machined feature and a second machined feature, the method comprising:

forming, by the first CNC machine, a first machined feature at a first region of the workpiece while the first region is positioned within a first active area of the first CNC machine;

measuring a first location of the first machined feature by engaging the first machined feature with an identification probe, wherein the identification probe has a geometry that is complementary to the first machined feature;

determining a second location for a second machined feature that is to be machined into a second region of the workpiece by a second CNC machine, wherein the second location is based on the first location of the first machined feature;

shifting the workpiece from the first CNC machine to the second CNC machine in a direction defined by a reference datum of a fixturing device such that the second region of the workpiece is positioned within a second active area of the second CNC machine; and forming, by the second CNC machine, the second machined feature at the second region of the workpiece, wherein the geometry of the identification probe is complementary to the second machined feature.

11. The method of claim 10, wherein the workpiece is rotated during the shifting by about 180 degrees.

12. The method of claim 10, wherein the identification probe provides an X-axis of the first machined feature.

13. The method of claim 10, wherein the first machined feature is a milled hole and the identification probe is capable of being inserted at least partially into the milled hole.

14. The method of claim 10, wherein the shifting is performed using a pneumatic manipulator.

15. The method of claim 10, further comprising:
determining a position of the first region within the first active area by using the first location of the first machined feature.

16. The method of claim 10, wherein the workpiece is fixed to the first active area via one or more securing mechanisms of the fixturing device that determine coordinates of an initial position of the workpiece.

17. The method of claim 16, wherein the one or more securing mechanisms include at least one of a clamp, a base, or an indexing feature.

* * * * *